(12) United States Patent
Kim

(10) Patent No.: US 12,483,183 B2
(45) Date of Patent: Nov. 25, 2025

(54) OIL TEMPERATURE CONTROL SYSTEM FOR ELECTRIC VEHICLE

(71) Applicants: Hyundai Motor Company, Seoul (KR); Kia Corporation, Seoul (KR)

(72) Inventor: Jong Won Kim, Cheonan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 242 days.

(21) Appl. No.: 18/329,282

(22) Filed: Jun. 5, 2023

(65) Prior Publication Data

US 2024/0266986 A1  Aug. 8, 2024

(30) Foreign Application Priority Data

Feb. 6, 2023 (KR) .................. 10-2023-0015301

(51) Int. Cl.
*H02P 29/62* (2016.01)
*B60K 1/02* (2006.01)
(Continued)

(52) U.S. Cl.
CPC ............ *H02P 29/62* (2016.02); *B60K 1/02* (2013.01); *B60K 17/356* (2013.01); *B60K 23/0808* (2013.01); *B60L 7/10* (2013.01); *B60L 15/2045* (2013.01); *B60K 2001/006* (2013.01); *B60L 2240/421* (2013.01); *B60L 2240/423* (2013.01); *B60L 2240/425* (2013.01); *B60L 2240/525* (2013.01); *B60L 2250/28* (2013.01)

(58) Field of Classification Search
CPC ......... H02P 29/62; B60K 1/02; B60K 17/356; B60K 23/0808; B60K 2001/006; B60K 2001/003; B60L 7/10; B60L 15/2045; B60L 2240/421; B60L 2240/423; B60L 2240/425; B60L 2240/525; B60L 2250/28; B60L 1/02; F01P 7/167; F01P 7/161; F01P 2025/13; H02K 11/25; H02K 9/19; B60Y 2200/91
USPC ......................................................... 318/473
See application file for complete search history.

(56) References Cited

U.S. PATENT DOCUMENTS

2021/0229646 A1 * 7/2021 Kim .................. B60T 8/17551

FOREIGN PATENT DOCUMENTS

FR       2973742 A1 * 10/2012
JP    2013056629 A  *  3/2013
(Continued)

*Primary Examiner* — Jorge L Carrasquillo
(74) *Attorney, Agent, or Firm* — SLATER MATSIL, LLP

(57) ABSTRACT

An embodiment oil temperature control system for an electric vehicle includes a heat exchange unit that performs heat exchange between an oil for cooling a driving motor and a coolant, a temperature sensor including an oil temperature sensor or an outside air temperature sensor, a controller that receives a signal from the temperature sensor to determine whether a heat generation mode entry condition to cause a power electronic part to generate heat is satisfied and operates the power electronic part in a heat generation mode when the heat generation mode entry condition is satisfied, and a cooling system that allows the coolant used to cool the power electronic part operating in the heat generation mode to circulate through a passage penetrating the heat exchange unit so that the coolant exchanges heat with the oil in the heat exchange unit.

20 Claims, 9 Drawing Sheets

(51) Int. Cl.
  *B60K 17/356* (2006.01)
  *B60K 23/08* (2006.01)
  *B60L 7/10* (2006.01)
  *B60L 15/20* (2006.01)
  *B60K 1/00* (2006.01)

(56) References Cited

FOREIGN PATENT DOCUMENTS

KR   20210153212 A      12/2021
KR   20220068371 A  *   5/2022

* cited by examiner

OIL TEMPERATURE CONTROL SYSTEM FOR ELECTRIC VEHICLE

CROSS-REFERENCE TO RELATED APPLICATIONS

This application claims the benefit of Korean Patent Application No. 10-2023-0015301, filed on Feb. 6, 2023, which application is hereby incorporated herein by reference.

TECHNICAL FIELD

The present disclosure relates to an oil temperature control system for an electric vehicle.

BACKGROUND

In a broad meaning, battery electric vehicles, hybrid vehicles, and fuel cell vehicles, which are eco-friendly vehicles, are electric vehicles that are driven using a motor. Eco-friendly vehicles are equipped with a motor that is a driving source for driving the vehicle and an inverter that converts direct current (DC) from a high-voltage power source into three-phase alternating current (AC) and applies the AC to the motor in order to drive and control the motor.

In the above eco-friendly vehicles, a motor is used to generate power for driving the vehicle. The motor for driving the eco-friendly vehicles, i.e., a driving motor, requires high efficiency and output density.

It is known that driving motors recently developed for eco-friendly vehicles have operational efficiency of about 90%, and the operational loss of the driving motors is mostly converted into heat. Therefore, it is necessary to build a stable heat management system in order to meet continuous demands for reduction in size, increase in output, and increase in efficiency of driving motors.

Since a large amount of heat is generated from a coil, etc. during operation of a motor, it is necessary to cool main parts including the coil. In particular, in the case of an interior permanent magnet synchronous motor (IPMSM) that is widely used as a driving motor for vehicles, cooling of the motor is important in terms of the efficiency of the motor and protection of main parts (a permanent magnet, a coil, etc.).

When the temperature of a permanent magnet exceeds a predetermined level, de-magnetization of the permanent magnet occurs, and therefore the intensity of magnetism decreases, which has a significant adverse influence on the efficiency of the motor.

Accordingly, it is necessary to effectively manage heat to cool a motor system in order to prevent the occurrence of burnout of a stator coil of the motor or the occurrence of de-magnetization of a permanent magnet of the motor in an overheating state in which the temperature of the motor system exceeds an allowable temperature. To this end, an appropriate heat management and cooling system, by which a motor is stably driven within an allowable temperature range, is required.

A heat management system for a motor, particularly a motor cooling system, may be classified into an air-cooling type using air, a water-cooling type using coolant, and an oil-cooling type using oil in accordance with a cooling fluid. The oil-cooling type may be classified into a scattering type using rotation of a motor and a pressure feeding type using an electric oil pump (EOP) in accordance with a spraying type.

Alternatively, the motor cooling system may be classified into a direct cooling type and an indirect cooling type. These days, a direct oil-cooling type having high cooling efficiency is widely used due to the demand for high cooling performance.

A recently developed motor cooling system is configured such that a cooling passage, through which a cooling fluid can pass, is formed in a part of a motor, such as a housing, a rotor core, or a stator core, and a cooling fluid (e.g., oil) supplied to the motor cools and lubricates the corresponding part while passing through the cooling passage.

For example, a hole may be formed through the rotor core to form a cooling passage therein, and oil supplied to the motor may cool the rotor core while passing through the cooling passage.

As described above, in an electric vehicle, oil is used to cool and lubricate a motor (a driving motor), which is a driving device for driving the vehicle. However, there is a problem in that the viscosity of the oil affects operation of the motor.

As the temperature decreases, the viscosity of oil increases. When an electric vehicle is driven in a low-temperature environment such as winter, the temperature of the oil decreases, and therefore the viscosity of the oil increases. Increase in the viscosity of the oil may lead to increase in resistance due to the oil when the motor is driven and rotated.

As a result, when an electric vehicle is driven in a low-temperature environment such as winter, the running resistance of the vehicle may increase due to an increase in the viscosity of oil for cooling a motor, and the increase in the running resistance may cause a reduction in the efficiency of use of electricity and the all-electric range (AER) of the electric vehicle.

The above information disclosed in this background section is only for enhancement of understanding of the background of embodiments of the invention, and therefore it may contain information that does not form the related art that is already known to a person of ordinary skill in the art.

SUMMARY

The present disclosure relates to an oil temperature control system for an electric vehicle. Particular embodiments relate to a temperature control system capable of controlling the temperature of oil used to cool and lubricate a driving motor to an appropriate temperature during travel of a vehicle in a low-temperature environment.

Embodiments of the present invention can solve problems associated with the related art, and embodiments of the present invention provide an oil temperature control system capable of controlling the temperature of oil for cooling and lubricating a driving motor to an appropriate temperature during travel of an electric vehicle.

Particularly, embodiments of the present invention provide an oil temperature control system for an electric vehicle that is capable of solving not only a problem of an increase in the running resistance of the vehicle due to a decrease in the temperature of oil and an increase in the viscosity of the oil when the vehicle is driven in a low-temperature environment, but also a problem of reduction in the efficiency of use of electricity and the all-electric range (AER) of the vehicle resulting from the increase in the running resistance of the vehicle.

The embodiments of the present invention are not limited to the above-mentioned embodiments, and other embodiments not mentioned herein will be clearly understood by those skilled in the art from the following description.

One embodiment of the present invention provides an oil temperature control system for an electric vehicle that includes a heat exchange unit configured to perform heat exchange between oil used to cool a driving motor and coolant in the electric vehicle, at least one temperature sensor selected from among an oil temperature sensor configured to detect the temperature of oil in the driving motor and an outside air temperature sensor configured to detect the temperature of outside air, a controller configured to receive a signal from the at least one temperature sensor to determine, based on the temperature detected by the at least one temperature sensor, whether a heat generation mode entry condition to cause a power electronic part to generate heat is satisfied and to operate the power electronic part in a heat generation mode upon determining that the heat generation mode entry condition is satisfied, and a cooling system configured to allow coolant used to cool the power electronic part operating in the heat generation mode to circulate through a passage penetrating the heat exchange unit so that the coolant exchanges heat with oil in the heat exchange unit.

In a preferred embodiment, the heat generation mode entry condition may be a condition in which the temperature detected by the at least one temperature sensor is equal to or lower than a predetermined set temperature.

In another preferred embodiment, the driving motor may include a front-wheel motor configured to drive front wheels and a rear-wheel motor configured to drive rear wheels, and the power electronic part may include at least one inverter selected from among a front-wheel inverter connected to the front-wheel motor to apply three-phase alternating current to the front-wheel motor and a rear-wheel inverter connected to the rear-wheel motor to apply three-phase alternating current to the rear-wheel motor.

In still another preferred embodiment, the oil temperature sensor may include a front-wheel-motor oil temperature sensor configured to detect the temperature of oil in the front-wheel motor and a rear-wheel-motor oil temperature sensor configured to detect the temperature of oil in the rear-wheel motor.

In yet another preferred embodiment, the oil temperature control system may further include a disconnector mounted between an auxiliary-drive-wheel motor, e.g., one of the front-wheel motor and the rear-wheel motor, and auxiliary drive wheels connected to the auxiliary-drive-wheel motor so that power is transmitted between the auxiliary-drive-wheel motor and the auxiliary drive wheels to allow or interrupt transmission of power between the auxiliary-drive-wheel motor and the auxiliary drive wheels. Upon entering the heat generation mode, the controller may control the disconnector to perform a disengagement operation to interrupt transmission of power between the auxiliary-drive-wheel motor and the auxiliary drive wheels.

In still yet another preferred embodiment, upon entering the heat generation mode, the controller may control operation of a main-drive-wheel motor, e.g., the remaining one of the front-wheel motor and the rear-wheel motor, such that driver demand torque is satisfied only by torque of the main-drive-wheel motor.

In a further preferred embodiment, upon entering the heat generation mode, in order to cause an inverter for the auxiliary-drive-wheel motor, e.g., one of the front-wheel inverter and the rear-wheel inverter, to generate heat, the controller may change a switching frequency of the inverter for the auxiliary-drive-wheel motor to a switching frequency set for the heat generation mode.

In another further preferred embodiment, upon entering the heat generation mode, the controller may determine a first maximum efficiency torque based on the current speed of a main-drive-wheel motor, e.g., one of the front-wheel motor and the rear-wheel motor. When a difference between the determined first maximum efficiency torque and the driver demand torque is equal to or greater than a predetermined threshold torque, the controller may change a switching frequency of an inverter for the main-drive-wheel motor, e.g., one of the front-wheel inverter and the rear-wheel inverter, to a switching frequency set for the heat generation mode. The changed switching frequency of the inverter for the main-drive-wheel motor may be a switching frequency set to allow the main-drive-wheel motor to operate with the first maximum efficiency torque.

In still another further preferred embodiment, in the state in which the heat generation mode is entered, the controller may change a switching frequency of an inverter for the auxiliary-drive-wheel motor, e.g., the remaining one of the front-wheel inverter and the rear-wheel inverter, to a switching frequency set for the heat generation mode. The changed switching frequency of the inverter for the auxiliary-drive-wheel motor may be a switching frequency set to allow the auxiliary-drive-wheel motor to perform regenerative braking with torque corresponding to the difference between the first maximum efficiency torque and the driver demand torque.

In yet another further preferred embodiment, the oil temperature control system may further include a disconnector mounted between the auxiliary-drive-wheel motor and auxiliary drive wheels connected to the auxiliary-drive-wheel motor so that power is transmitted between the auxiliary-drive-wheel motor and the auxiliary drive wheels to allow or interrupt transmission of power between the auxiliary-drive-wheel motor and the auxiliary drive wheels. Upon entering the heat generation mode, the controller may control the disconnector to perform an engagement operation to allow transmission of power between the auxiliary-drive-wheel motor and the auxiliary drive wheels.

In still yet another further preferred embodiment, upon entering the heat generation mode, the controller may determine a first maximum efficiency torque based on the current speed of a main-drive-wheel motor, e.g., one of the front-wheel motor and the rear-wheel motor. When a difference between the determined first maximum efficiency torque and the driver demand torque is less than a predetermined threshold torque, the controller may determine a second maximum efficiency torque based on the current speed of an auxiliary-drive-wheel motor which may be the remaining one of the front-wheel motor and the rear-wheel motor. The controller may change a switching frequency of an inverter for the auxiliary-drive-wheel motor, e.g., one of the front-wheel inverter and the rear-wheel inverter, to a switching frequency set for the heat generation mode. The changed switching frequency of the inverter for the auxiliary-drive-wheel motor may be a switching frequency set to allow the auxiliary-drive-wheel motor to perform regenerative braking with the second maximum efficiency torque.

In a still further preferred embodiment, in the state in which the heat generation mode is entered, the controller may change a switching frequency of an inverter for the main-drive-wheel motor, e.g., the remaining one of the front-wheel inverter and the rear-wheel inverter, to a switching frequency set for the heat generation mode. The changed switching frequency of the inverter for the main-drive-wheel motor may be a switching frequency set to allow the main-drive-wheel motor to operate with torque corresponding to a sum of the second maximum efficiency torque and the driver demand torque.

In a yet still further preferred embodiment, the oil temperature control system may further include a disconnector mounted between the auxiliary-drive-wheel motor and auxiliary drive wheels connected to the auxiliary-drive-wheel motor so that power is transmitted between the auxiliary-drive-wheel motor and the auxiliary drive wheels to allow or interrupt transmission of power between the auxiliary-drive-wheel motor and the auxiliary drive wheels. Upon entering the heat generation mode, the controller may control the disconnector to perform an engagement operation to allow transmission of power between the auxiliary-drive-wheel motor and the auxiliary drive wheels.

In a yet still further preferred embodiment, the cooling system may include a radiator configured to dissipate heat from a coolant, a water pump configured to circulate the coolant along a coolant line, a bypass line branching from the coolant line to allow the coolant bypassing the radiator to flow therethrough, and a flow control valve configured to control a flow of the coolant such that the coolant circulates along the bypass line without passing through the radiator. Upon entering the heat generation mode, the controller may control the flow control valve such that the coolant flows along the bypass line without passing through the radiator.

Other aspects and preferred embodiments of the invention are discussed infra.

The above and other features of embodiments of the invention are discussed infra.

BRIEF DESCRIPTION OF THE DRAWINGS

The above and other features of embodiments of the present invention will now be described in detail with reference to certain exemplary embodiments thereof, illustrated in the accompanying drawings, which are given hereinbelow by way of illustration only, and thus are not limitative of embodiments of the present invention, and wherein.

Figure 1:
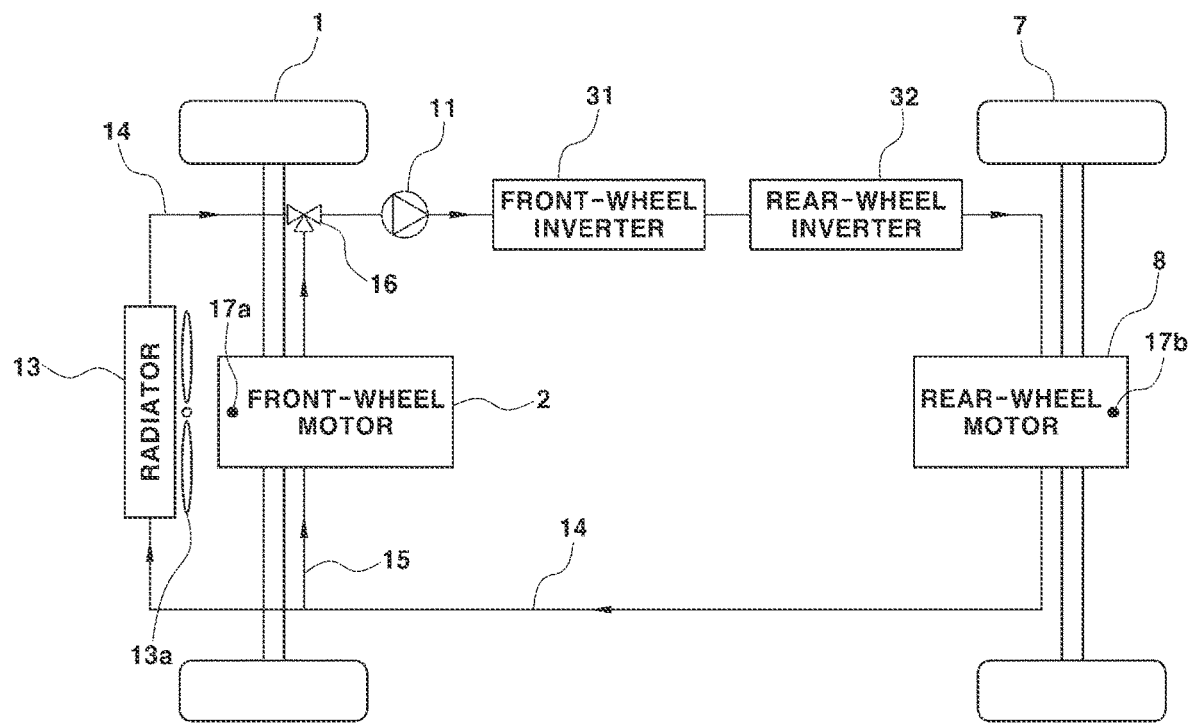
FIG. 1 is a diagram showing a cooling circuit in a heat management system of an electric vehicle to which an embodiment of the present invention is applied.

It should be understood that the appended drawings are not necessarily to scale, presenting a somewhat simplified representation of various preferred features illustrative of the basic principles of embodiments of the invention. The specific design features of embodiments of the present invention as disclosed herein, including, for example, specific dimensions, orientations, locations, and shapes, will be determined in part by the particular intended application and use environment.

In the figures, reference numbers refer to the same or equivalent parts throughout the several figures of the drawings.

DETAILED DESCRIPTION OF ILLUSTRATIVE EMBODIMENTS

Various exemplary embodiments will now be described more fully with reference to the accompanying drawings, in which only some exemplary embodiments are shown. Specific structural and functional details disclosed herein are merely representative for the purpose of describing exemplary embodiments. Embodiments of the present invention, however, may be embodied in many alternate forms and should not be construed as being limited only to the exemplary embodiments set forth herein. Accordingly, while exemplary embodiments of the invention are capable of being variously modified and taking alternative forms, embodiments thereof are shown by way of example in the drawings and will herein be described in detail. It should be understood, however, that there is no intent to limit the embodiments of the present invention to the particular exemplary embodiments disclosed. On the contrary, exemplary embodiments are to cover all modifications, equivalents, and alternatives falling within the scope of the invention.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the exemplary embodiments of the present invention.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Wherever possible, the same reference numbers will be used throughout the drawings to refer to the same or like parts. The terminology used herein is for the purpose of describing particular embodiments only and is not intended to be limiting of exemplary embodiments of the invention. As used herein, the singular forms "a," "an," and "the" are intended to include the plural forms as well, unless the context clearly indicates otherwise. It will be further understood that the terms "comprises", "comprising", "includes", and/or "including", when used herein, specify the presence of stated components, steps, operations, and/or elements, but do not preclude the presence or addition of one or more other components, steps, operations, and/or elements.

Embodiments of the present invention relate to an oil temperature control system for an electric vehicle that is capable of controlling the temperature of oil used to cool and lubricate a driving motor to an appropriate temperature during travel of the electric vehicle.

In general, in an electric vehicle, oil is used to cool and lubricate a driving motor (hereinafter abbreviated to "motor") for driving the vehicle, and the oil used in the motor is cooled in a heat exchange unit.

The heat exchange unit is one of heat exchangers provided in the vehicle to perform heat exchange between different media. The heat exchange unit is configured to allow oil for cooling and lubricating the motor and coolant for managing heat of the vehicle to pass therethrough, so that the oil and the coolant exchange heat with each other.

In embodiments of the present invention, the heat exchange unit may be a general oil cooler in which heat exchange between the oil and the coolant is performed so that the oil used in the motor driving the vehicle is cooled. The oil heated by the motor is cooled by heat exchange with the coolant in the oil cooler while the oil for the motor and the coolant for the heat management system pass through the oil cooler.

FIG. 1 is a diagram showing a cooling circuit in a heat management system of an electric vehicle to which an embodiment of the present invention is applied. Specifically, FIG. 1 is a circuit diagram of a water-cooling-type cooling system in which coolant circulates in a heat management system of an electric vehicle.

Figure 2:
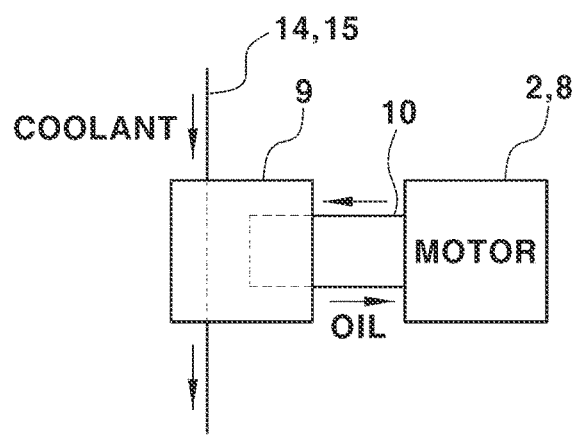
FIG. 2 is a diagram showing an oil cooler in a heat management system of an electric vehicle to which an embodiment of the present invention is applied.
Figure 3:
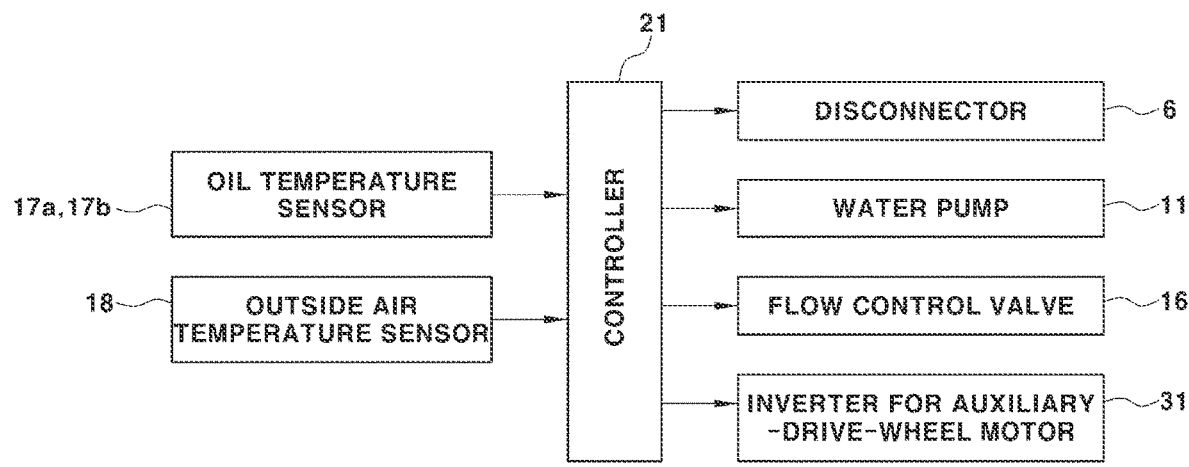
FIG. 3 is a block diagram showing main components of an oil temperature control system according to an embodiment of the present invention.

FIG. 2 is a diagram showing an oil cooler in a heat management system of an electric vehicle to which an embodiment of the present invention is applied, and FIG. 3 is a block diagram showing main components of an oil temperature control system according to an embodiment of the present invention.

In the following description, an in-vehicle device or part that has a coolant passage formed therein to allow coolant to pass therethrough and whose temperature is controlled by the coolant passing through the coolant passage will be referred to as a "part to be thermally managed."

As shown in the drawings, the heat management system of the vehicle includes a water-cooling-type cooling system configured to allow coolant to circulate therethrough. The water-cooling-type cooling system includes a water pump 11 configured to suck and discharge the coolant to realize circulation of the coolant and a radiator 13 configured to dissipate heat from the coolant that has passed through a part to be thermally managed.

In addition, the water-cooling-type cooling system further includes a coolant line 14 disposed between the water pump 11 and the radiator 13 so as to be connected thereto to allow the coolant to circulate therethrough, a bypass line 15 interconnecting an inlet-side coolant line to the radiator 13 and an outlet-side coolant line from the radiator 13, and a flow control valve 16 configured to selectively open or close the coolant passages of the coolant line 14 and the bypass line 15 so that the coolant circulating through the coolant line 14 selectively passes through the radiator 13.

Among the above components, the radiator 13 constitutes a cooling module of the vehicle together with a cooling fan 13a, and the cooling module is mounted in the front end portion of the vehicle.

In the radiator 13, the outside air introduced thereinto through an opening in the front end portion of the vehicle and the coolant passing therethrough exchange heat with each other. In this case, the coolant passing through the radiator may absorb heat from the outside air. In most cases, however, heat of the coolant passing through the radiator is dissipated to the outside air.

The water pump 11 may be an electric water pump whose operation is controlled by a controller 21, and the flow control valve 16 may be a 3-way valve mounted at a point at which the bypass line 15 diverges from the outlet-side coolant line 14 from the radiator 13.

The flow control valve 16 may be an electronic valve whose degree of opening is controlled by the controller 21. Depending on the degree of opening of the flow control valve 16, the coolant may bypass the radiator 13 through the bypass line 15, rather than passing through the radiator 13.

For example, when the passage of the outlet-side coolant line from the radiator 13 is closed and the passage of the bypass line 15 is opened by the flow control valve 16, the coolant flows along the bypass line 15 and therefore bypasses the radiator 13, rather than passing through the radiator 13.

On the contrary, when the passage of the outlet-side coolant line from the radiator 13 is opened and the passage of the bypass line 15 is closed by the flow control valve 16, the coolant circulates through the passage in the radiator 13, and thus exchanges heat with the outside air in the radiator 13.

Although not shown in FIG. 1, a reservoir in which the coolant is stored may be mounted in the coolant circulation passage between the radiator 13 and the electric water pump 11.

Accordingly, the coolant that has passed through the radiator 13 may move to the reservoir to be stored therein, and the coolant in the reservoir may be sucked and pumped by the electric water pump 11 to circulate along the coolant line 14.

The outlet-side (rear-side) coolant line from the radiator 13 and the inlet-side (front-side) coolant line to the electric water pump 11 may be connected to the reservoir. Alternatively, the reservoir may be integrally formed with the electric water pump 11. In this case, the suction port of the electric water pump 11 may be integrally connected to the reservoir.

In the water-cooling-type cooling system, the coolant line 14 is connected to the coolant passage of the part to be thermally managed or the heat exchange unit (reference numeral 9 in FIG. 2), whereby the coolant circulating through the coolant line 14 passes through the coolant passage of the part to be thermally managed or the heat exchange unit.

In embodiments of the present invention, the part to be thermally managed may be a power electronic (PE) part of the vehicle. Specifically, the part to be thermally managed includes a front-wheel motor 2 connected to front wheels 1 so as to transmit power to the front wheels 1 to drive the same, a rear-wheel motor 8 connected to rear wheels 7 so as to transmit power to the rear wheels 7 to drive the same, a front-wheel inverter 31 electrically connected to the front-wheel motor 2 in order to drive and control the front-wheel motor 2, and a rear-wheel inverter 32 electrically connected to the rear-wheel motor 8 in order to drive and control the rear-wheel motor 8.

Among the above-mentioned parts to be thermally managed, the front-wheel inverter 31 and the rear-wheel inverter 32 have coolant passages formed therein and are cooled by the coolant passing through the coolant passages.

The oil temperature control system for an electric vehicle according to embodiments of the present invention further includes a heat exchange unit for cooling oil of the motor in addition to the components of the water-cooling-type cooling system described above. The heat exchange unit includes a heat exchange unit (reference numeral 9 in FIG. 2) for cooling oil of the front-wheel motor 2 and a heat exchange unit 9 for cooling oil of the rear-wheel motor 8.

That is, in order to cool oil, each of the front-wheel motor 2 and the rear-wheel motor 8 is provided with a heat exchange unit 9 in which heat exchange between oil and coolant is performed. The coolant line 14 (or the bypass line 15) and an oil line 10 are connected to the heat exchange unit 9.

Accordingly, the coolant circulating along the coolant line 14 (or the coolant passing through the bypass line 15) may exchange heat with the oil circulating along the oil line 10 in the heat exchange unit 9. Through this heat exchange, the temperature of the oil may be adjusted by the coolant.

The heat exchange unit 9 may be a general oil cooler configured to perform heat exchange between the oil supplied thereto through the oil line 10 from the motor 2 or 8 after cooling the motor 2 or 8 and the coolant supplied thereto through the coolant line 14 or the bypass line 15. The oil that has cooled the motor may be cooled by the coolant in the oil cooler.

In the cooling circuit illustrated in FIG. 1, the heat exchange unit (the oil cooler) of the front-wheel motor 2 is disposed in the middle of the bypass line 15 (refer to FIG. 2), and the bypass line 15 is connected to the coolant outlet side and the coolant inlet side of the heat exchange unit of the front-wheel motor 2.

In addition, the front-wheel inverter 31, the rear-wheel inverter 32, and the heat exchange unit 9 of the rear-wheel motor 8 are disposed in the middle of the coolant line 14 between the outlet side of the water pump 11 and the inlet side of the radiator 13.

That is, the front-wheel inverter 31, the rear-wheel inverter 32, and the heat exchange unit 9 of the rear-wheel motor 8 are disposed in the rear-side coolant line 14 from the water pump 11, i.e., the outlet-side (downstream-side) coolant line 14 from the water pump 11 (refer to FIG. 2).

In this case, the rear-side coolant line 14 from the water pump 11 is connected to the coolant passage inlet side and the coolant passage outlet side of the front-wheel inverter 31 so as to communicate with the coolant passage of the front-wheel inverter 31, and the coolant-passage-outlet-side coolant line 14 from the front-wheel inverter is connected to the coolant passage inlet side of the rear-wheel inverter.

In addition, the coolant line 14 is connected to the coolant passage inlet side and the coolant passage outlet side of the rear-wheel inverter 32 so as to communicate with the coolant passage of the rear-wheel inverter 32, and the coolant-passage-outlet-side coolant line from the rear-wheel inverter 32 is connected to the heat exchange unit 9 of the rear-wheel motor 8.

In this case, the coolant-passage-outlet-side coolant line from the rear-wheel inverter 32 is connected to the inlet side of the heat exchange unit 9 of the rear-wheel motor 8, and the coolant line 14 connected to the outlet side of the heat exchange unit 9 of the rear-wheel motor 8 is connected to the inlet side of the radiator 13.

Figure 4:
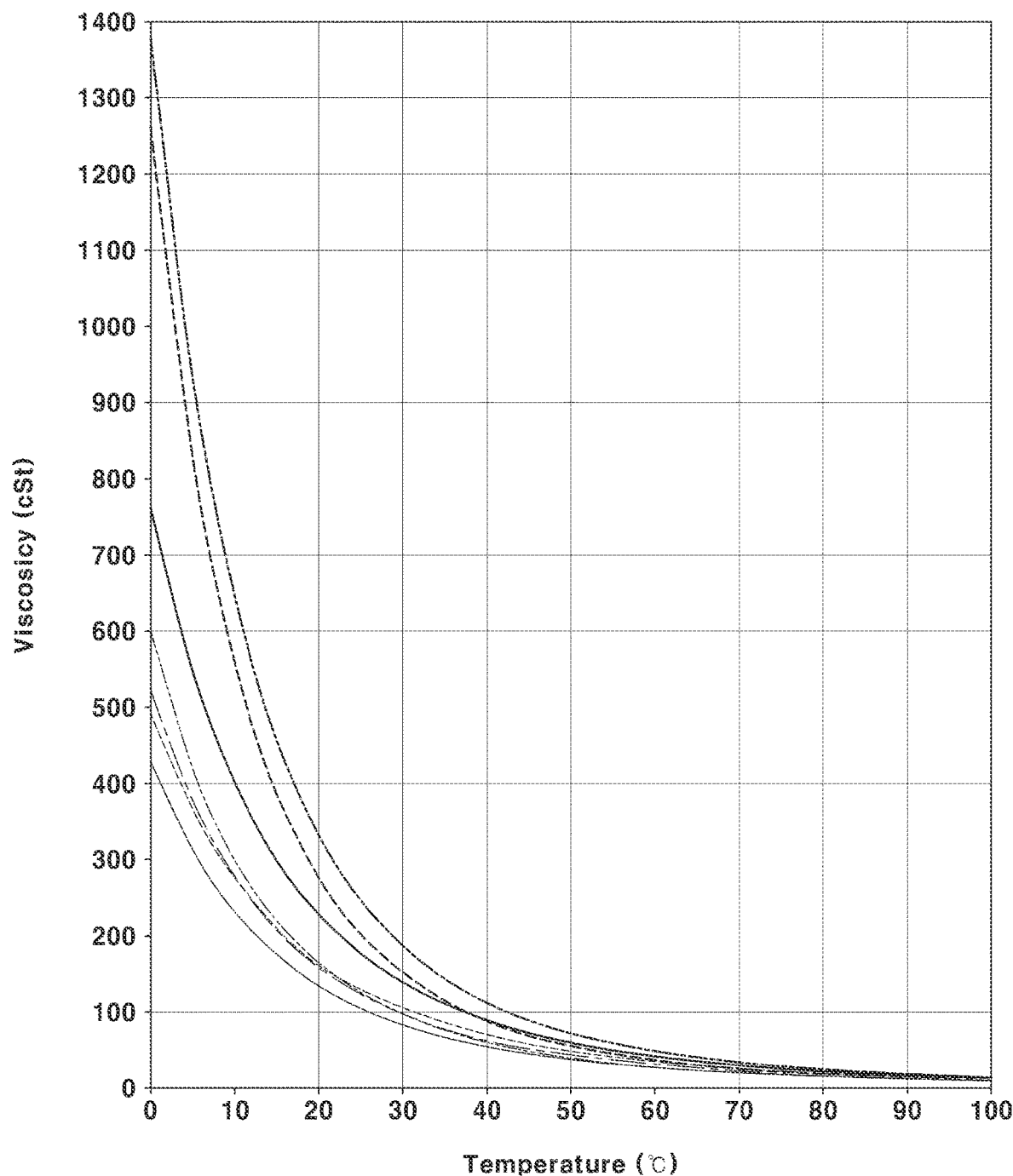
FIG. 4 is a diagram showing changes in the viscosity of oil depending on changes in temperature.

FIG. 4 is a diagram showing changes in the viscosity of various kinds of oil depending on changes in temperature. Referring to FIG. 4, it can be seen that the viscosity of the oil greatly increases as the temperature of the oil decreases.

If the oil used to cool and lubricate the front-wheel motor 2 and the rear-wheel motor 8 decreases in temperature and thus increases in viscosity, the rotational resistance of the motors may increase due to the increase in the viscosity of the oil, leading to an increase in the running resistance of the vehicle. As a result, the efficiency of use of electricity and the all-electric range (AER) of the vehicle may be reduced due to the increase in the running resistance.

Therefore, embodiments of the present invention provide an oil temperature control system capable of solving not only a problem of an increase in the running resistance of the vehicle due to a decrease in the temperature of the oil in the motor and an increase in the viscosity of the oil when the vehicle is driven in a low-temperature environment, but also a problem of reduction in the efficiency of use of electricity and the all-electric range (AER) of the vehicle resulting from the increase in the running resistance of the vehicle.

According to embodiments of the present invention, the temperature of the oil used in the motor is controlled to a predetermined level or higher on the basis of conversion of power by the inverter and the heat capacity characteristics of the inverter. In particular, the temperature of the coolant is controlled using heat deliberately generated from the inverter in order to control the temperature of the oil.

Upon determining, based on values detected by temperature sensors 17a, 17b, and 18, that a predetermined heat generation mode entry condition is satisfied, the controller 21 controls operation of the inverters 31 and 32 in order to deliberately generate heat from the inverters 31 and 32. Accordingly, the coolant increases in temperature while passing through the inverters 31 and 32 that are generating heat.

It is possible to increase the temperature of the coolant circulating through the cooling system using heat deliberately generated from the inverters 31 and 32 through the above-described control of operation of the inverters 31 and 32 and to increase the temperature of the oil in the heat exchange unit 9 using the heated coolant, thereby solving not only a problem of an increase in the running resistance of the vehicle due to a decrease in the temperature of the oil in the motors 2 and 8 and an increase in the viscosity of the oil, but also a problem of reduction in the efficiency of use of electricity and the all-electric range (AER) of the vehicle resulting from the increase in the running resistance of the vehicle.

A mode in which a switching operation of a power conversion switching element of a power module in the inverter is controlled at a predetermined switching frequency in order to deliberately generate heat from the inverter will be referred to as a "heat generation mode." Here, the inverter is the front-wheel inverter 31 or the rear-wheel inverter 32.

The oil temperature control system for an electric vehicle according to embodiments of the present invention may further include oil temperature sensors 17a and 17b for detecting the temperature of the oil in the motors and a controller 21 for controlling the inverters 31 and 32 such that the heat generation mode is performed in accordance with values detected by the oil temperature sensors 17a and 17b.

Here, the oil temperature sensors may include an oil temperature sensor 17a for detecting the temperature of the oil in the front-wheel motor and an oil temperature sensor 17b for detecting the temperature of the oil in the rear-wheel motor.

Alternatively, the oil temperature control system for an electric vehicle according to embodiments of the present invention may include an outside air temperature sensor 18 for detecting the temperature of the outside air instead of the oil temperature sensors 17a and 17b described above. Alternatively, the oil temperature control system for an electric vehicle according to embodiments of the present invention may include both the oil temperature sensors 17a and 17b and the outside air temperature sensor 18. The controller 21 may acquire real-time information on the temperature of the oil and the temperature of the outside air from signals from the oil temperature sensors 17a and 17b and the outside air temperature sensor 18.

In embodiments of the present invention, the heat generation mode entry condition may be satisfied when the temperature detected by at least one temperature sensor selected from among the oil temperature sensors 17a and 17b and the outside air temperature sensor 18 is equal to or lower than a predetermined set temperature.

The controller 21 may be set to enter the heat generation mode upon determining that the heat generation mode entry condition is satisfied. For example, in embodiments of the present invention, the controller 21 may enter the heat generation mode upon determining that all of the current temperatures of the oil, which are values detected by the oil temperature sensors 17a and 17b, are equal to or lower than a first set temperature.

Alternatively, in embodiments of the present invention, the controller 21 may enter the heat generation mode upon determining that the current temperature of the outside air, which is a value detected by the outside air temperature sensor 18, is equal to or lower than a second set temperature.

Alternatively, in embodiments of the present invention, the controller 21 may enter the heat generation mode upon determining that all of the current temperatures of the oil, which are values detected by the oil temperature sensors 17a and 17b, are equal to or lower than the first set temperature, and the current temperature of the outside air, which is a value detected by the outside air temperature sensor 18, is equal to or lower than the second set temperature.

When the above-described heat generation mode entry condition is satisfied and the heat generation mode is entered, the controller 21 operates switching elements of power modules in the inverters 31 and 32 at a switching frequency set for the heat generation mode in order to deliberately generate heat from the inverters.

Meanwhile, the oil temperature control system for an electric vehicle according to embodiments of the present invention may further include a power transmission device disposed between the motor and the wheels. Here, the power transmission device may be mounted on an axle 5 between the front-wheel motor 2 and the front wheels 1 or an axle 5 between the rear-wheel motor 8 and the rear wheels 7. More specifically, in embodiments of the present invention, the power transmission device disposed between the motor and the wheels may be a general disconnector 6 configured to be controlled by the controller 21.

In embodiments of the present invention, the power transmission device is implemented as a disconnector 6 for use in four-wheel drive electric vehicles. The disconnector 6 is mounted on the axle 5 between the front-wheel motor 2 and the front wheels 1 or the axle 5 between the rear-wheel motor 8 and the rear wheels 7. In addition, engagement and disengagement (release) operations of the disconnector 6 are controlled in response to a control signal output from the controller 21.

In a four-wheel drive electric vehicle, the disconnector 6 performs connection or disconnection between the front-wheel motor 2 and the front wheels 1 or between the rear-wheel motor 8 and the rear wheels 7 so that transmission of power therebetween is allowed or interrupted.

As related art documents, Korean Patent Laid-Open Publication No. 10-2022-0068371 (May 26, 2022) and Korean Patent Laid-Open Publication No. 10-2020-0070006 (Jun. 10, 2020) disclose disconnectors that can be used in embodiments of the present invention. For the disconnector used in embodiments of the present invention, reference may be made to the above-mentioned related art documents.

In recent years, four-wheel drive (4WD) or all-wheel drive (AWD) electric vehicles that are each equipped with an independent driving device for front wheels and an independent driving device for rear wheels have been developed. The driving device for the front wheels and the driving device for the rear wheels in the four-wheel drive electric vehicle may be driven individually or together according to a driving environment condition. Both the driving device for the front wheels and the driving device for the rear wheels in the electric vehicle are motors that operate using power of a battery.

The electric vehicle to which an embodiment of the present invention is applied may be a four-wheel drive electric vehicle that is equipped with the front-wheel and rear-wheel motors 2 and 8, which are driving devices, and the front-wheel and rear-wheel inverters 31 and 32, as described above.

In addition, the electric vehicle to which an embodiment of the present invention is applied may be an electric vehicle that is driven in a two-wheel drive (2WD) mode, as a basic driving mode, in which either the front wheels 1 or the rear wheels 7 are used as drive wheels, and, when driving force is insufficient, is driven in a four-wheel drive (4WD) mode in which the remaining wheels in an idle state are additionally used as drive wheels.

In particular, the electric vehicle to which an embodiment of the present invention is applied may be a four-wheel drive electric vehicle that is equipped with the disconnector 6 for allowing or interrupting transmission of power between the motor and the wheels in order to facilitate selection of and transition between the two-wheel drive (2WD) mode and the four-wheel drive (4WD) mode described above.

Figure 5A:
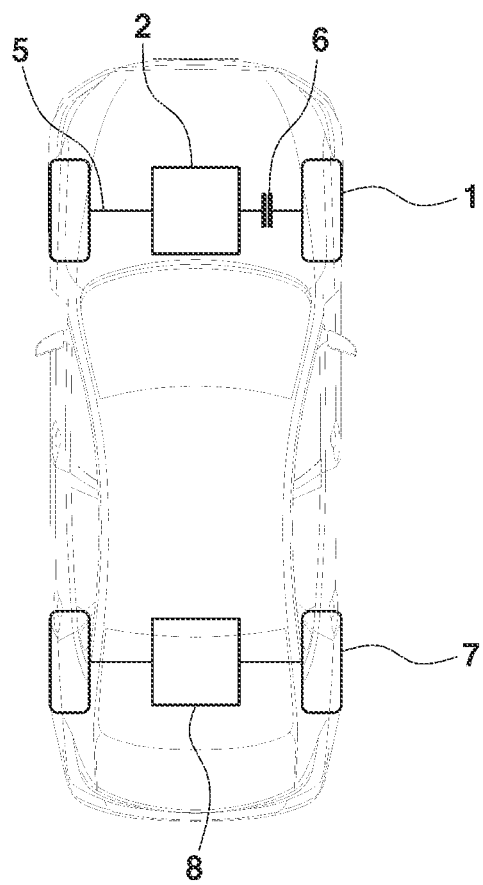
FIGS. 5A and 5B are diagrams illustrating an electric vehicle equipped with a front-wheel motor, a rear-wheel motor, and a disconnector as a vehicle to which an embodiment of the present invention is applied.
Figure 5B:
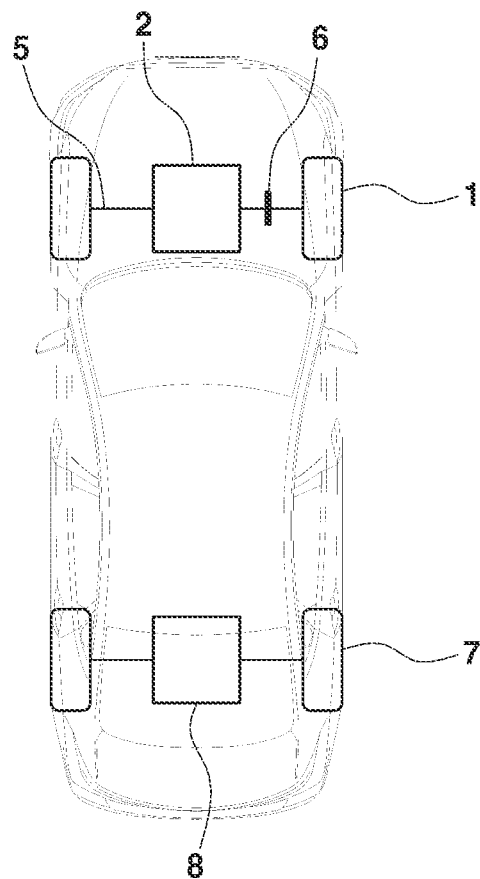
Figure 6:
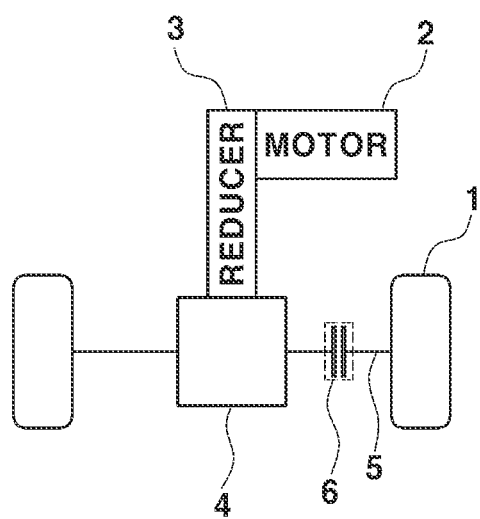
FIG. 6 is a diagram showing the configuration of a powertrain for auxiliary drive wheels and disposition of parts thereof in the vehicle illustrated in FIGS. 5A and 5B in more detail.

FIGS. 5A and 5B are diagrams illustrating an electric vehicle equipped with a front-wheel motor, a rear-wheel motor, and a disconnector as a vehicle to which an embodiment of the present invention is applied, and FIG. 6 is a diagram showing the configuration of a powertrain for auxiliary drive wheels and disposition of parts thereof in the vehicle illustrated in FIGS. 5A and 5B in more detail.

As shown in FIGS. 5A and 5B, it can be seen that a front-wheel motor 2 for driving the front wheels 1 and a rear-wheel motor 8 for driving the rear wheels 7 are mounted in the four-wheel drive electric vehicle.

In the example shown in FIGS. 5A and 5B, the disconnector 6 is mounted on the axle 5 between the front-wheel motor 2 and the front wheels 1. Alternatively, the disconnector 6 may be mounted on the axle 5 between the rear-wheel motor 8 and the rear wheels 7.

In the four-wheel drive electric vehicle, a motor and drive wheels that are not used in the two-wheel drive mode are defined. The four-wheel drive electric vehicle may be driven in the four-wheel drive (4WD) mode in which both the front-wheel motor 2 and the rear-wheel motor 8 are driven or in the two-wheel drive (2WD) mode in which only one of the front-wheel motor 2 and the rear-wheel motor 8 is driven.

In the four-wheel drive electric vehicle equipped with the front-wheel motor 2 and the rear-wheel motor 8, drive wheels that are used in the two-wheel drive mode may be referred to as "main drive wheels", and drive wheels that are not used in the two-wheel drive mode may be referred to as "auxiliary drive wheels". In this case, when the auxiliary drive wheels are not used during travel of the vehicle (i.e., when the vehicle is driven in the 2WD mode), reverse driving force may be transmitted from the auxiliary drive wheels, and therefore drag loss may occur.

Therefore, it is necessary to prevent the occurrence of drag loss by blocking a reverse driving force transmitted from the auxiliary drive wheels in the two-wheel drive mode. To this end, the disconnector 6 may be mounted on the axle of the auxiliary drive wheels.

In the following description, among the front-wheel motor and the rear-wheel motor of the vehicle, the motor 8 connected to the main drive wheels 7 so as to transmit power to the main drive wheels 7 at all times will be referred to as a "main-drive-wheel motor" (or "first motor"), and the motor 2 connected to the auxiliary drive wheels 1 via the disconnector 6 will be referred to as an "auxiliary-drive-wheel motor" (or "second motor").

In embodiments of the present invention, the disconnector 6 is a device that is mounted on the axle 5 of the auxiliary drive wheels 1 to perform connection or disconnection between the auxiliary drive wheels 1 and the auxiliary-drive-wheel motor 2 so that transmission of power therebetween is allowed or interrupted.

When the vehicle equipped with the disconnector 6 is driven in the four-wheel drive mode, the disconnector mounted on the axle 5 performs an engagement operation to allow transmission of power, and when the vehicle equipped with the disconnector 6 is driven in the two-wheel drive mode, the disconnector mounted on the axle 5 performs a disengagement (release) operation to interrupt transmission of power.

FIGS. 5A and 5B illustrate an electric vehicle equipped with a front-wheel disconnector 6. In the illustrated vehicle, the front wheels 1 are auxiliary drive wheels, and the front-wheel disconnector 6, which allows or interrupts transmission of power, is mounted on the axle 5 between the front wheels 1, which are auxiliary drive wheels, and a part of a front-wheel drive system, such as the front-wheel motor 2, specifically between the front wheels 1 and a differential 4 among parts of the front-wheel drive system.

In the vehicle equipped with the front-wheel disconnector 6, when the front-wheel disconnector is in an engaged state, the vehicle may be driven in the four-wheel drive mode, and when the front-wheel disconnector is in a disengaged state, the vehicle may be driven in the rear-wheel drive mode.

Referring to FIG. 6, the disconnector 6 is mounted on the axle 5 between a reducer 3 and the auxiliary drive wheels 1 (the front wheels in the example shown in FIGS. 5A and 5B), and includes components configured to allow or interrupt transmission of power between an input shaft and an output shaft.

Here, the input shaft of the disconnector 6 may be a portion of the axle that is connected to the output side of the differential 4, and the output shaft of the disconnector 6 may be a portion of the axle that is connected to the auxiliary drive wheel 1.

In the four-wheel drive mode, the input shaft of the disconnector 6 receives the rotational force of the motor 2 (the front-wheel motor in the example shown in FIGS. 5A and 5B) through the reducer 3 and the differential 4, and the output shaft of the disconnector 6 transmits the rotational force transmitted to the input shaft thereof to the auxiliary drive wheels 1 in the engaged state thereof.

In the two-wheel drive mode in which the auxiliary-drive-wheel motor 2 is not driven, the disconnector 6 performs a disengagement operation to interrupt transmission of power between the parts of the drive system, such as the reducer 3 and the differential 4, and the auxiliary drive wheels 1 (the front wheels in the example shown in FIGS. 5A and 5B) in order to prevent the occurrence of drag loss due to transmission of a reverse driving force from the auxiliary drive wheels 1 to the reducer 3.

Accordingly, in the vehicle equipped with the disconnector 6, the auxiliary-drive-wheel motor 2 for driving the auxiliary drive wheels 1 operates only in the four-wheel drive mode, and only the main-drive-wheel motor 8 (the rear-wheel motor in the example shown in FIGS. 5A and 5B) for driving the main drive wheels 7 (the rear-wheels in the example shown in FIGS. 5A and 5B) operates in the two-wheel drive mode.

In addition, when the auxiliary-drive-wheel motor 2 performs a regenerative braking operation, the disconnector 6 enters the engaged state so that the rotational force of the auxiliary drive wheels 1 is transmitted to the auxiliary-drive-wheel motor 2.

Due to the disconnector 6 selectively performing engagement and disengagement (release) operations, it is possible to allow or interrupt transmission of power through the axle 5. In detail, the disconnector 6 performs connection or disconnection between the auxiliary drive wheels 1 and the auxiliary-drive-wheel motor 2 to allow or interrupt transmission of power therebetween.

In embodiments of the present invention, the disconnector 6 may be a front-wheel disconnector disposed between the front-wheel motor 2 and the front wheels 1 or may be a rear-wheel disconnector disposed between the rear-wheel motor 8 and the rear wheels 7. In the electric vehicle equipped with the front-wheel disconnector 6, the controller 21 may operate the front-wheel inverter 31 in the heat generation mode in order to increase the temperature of the oil in the motor.

In this case, the front-wheel disconnector 6 is controlled by the controller 21 so as to enter the disengaged state. In the disengaged state of the front-wheel disconnector 6, the front-wheel motor 2 and the front wheels 1 are in a state of being disconnected from each other, so that transmission of power therebetween is interrupted. Therefore, when the front-wheel inverter 31 is operated in the heat generation mode, the operational state of the front-wheel motor 2 does not affect the travel state of the vehicle.

According to embodiments of the present invention, in the electric vehicle equipped with the front-wheel disconnector 6, the controller 21 controls a switching operation of switching elements of the front-wheel inverter 31 at a predetermined frequency (a switching frequency set for the heat generation mode) in order to deliberately generate heat from the front-wheel inverter 31. In this case, the heat generated from the front-wheel inverter 31 may be transferred to the coolant passing through the coolant passage of the front-wheel inverter.

Accordingly, the temperature of the coolant circulating through the coolant line 14 may be increased. When the temperature of the coolant is increased, the oil of the front-wheel motor 2 and the oil of the rear-wheel motor 8 may increase in temperature in the heat exchange unit 9. Of course, when the heat generation mode is implemented in the vehicle equipped with the front-wheel disconnector 6, the torque of the rear-wheel motor 8 satisfies the driver demand torque.

So far, the vehicle equipped with the front-wheel disconnector has been described by way of example. In the case of a vehicle equipped with a rear-wheel disconnector configured to allow or interrupt transmission of power between the rear-wheel motor 8 and the rear wheels 7, the controller 21 controls the rear-wheel disconnector to perform a disengagement operation and controls a switching operation of switching elements of the rear-wheel inverter 32 at a switching frequency set for the heat generation mode.

In the vehicle equipped with the rear-wheel disconnector, when the rear-wheel inverter 32 is operated in the heat generation mode, the coolant circulating along the coolant line 14 may absorb heat generated from the rear-wheel inverter while passing through the coolant passage of the rear-wheel inverter 32.

In addition, the coolant that has absorbed heat from the rear-wheel inverter 32 flows to the heat exchange units (oil coolers) 9 of the front-wheel motor 2 and the rear-wheel motor 8, and the heated coolant may increase the temperature of the oil through heat exchange with the oil while passing through the heat exchange units 9.

As described above, while the rear-wheel inverter 32 is operated in the heat generation mode, the rear-wheel disconnector (not shown) is controlled to enter the disengaged (released) state so that transmission of power between the rear-wheel motor 8 and the rear wheels 7 is interrupted. Therefore, even when the switching operation of switching elements of the rear-wheel inverter 32 is controlled at a predetermined switching frequency, the torque of the rear-wheel motor 8 is not transmitted to the rear wheels 7, and therefore the operational state of the rear-wheel motor 8 does not affect the travel state of the vehicle.

In addition, while the heat generation mode for increasing the temperature of the oil in the motor is performed in the vehicle equipped with the rear-wheel disconnector, the driver demand torque is satisfied by the front-wheel motor 2 in the disengaged state of the rear-wheel disconnector. To this end, the controller 21 controls operation of the front-wheel inverter 31 so that the torque of the front-wheel motor 2 follows the driver demand torque.

Figure 7:
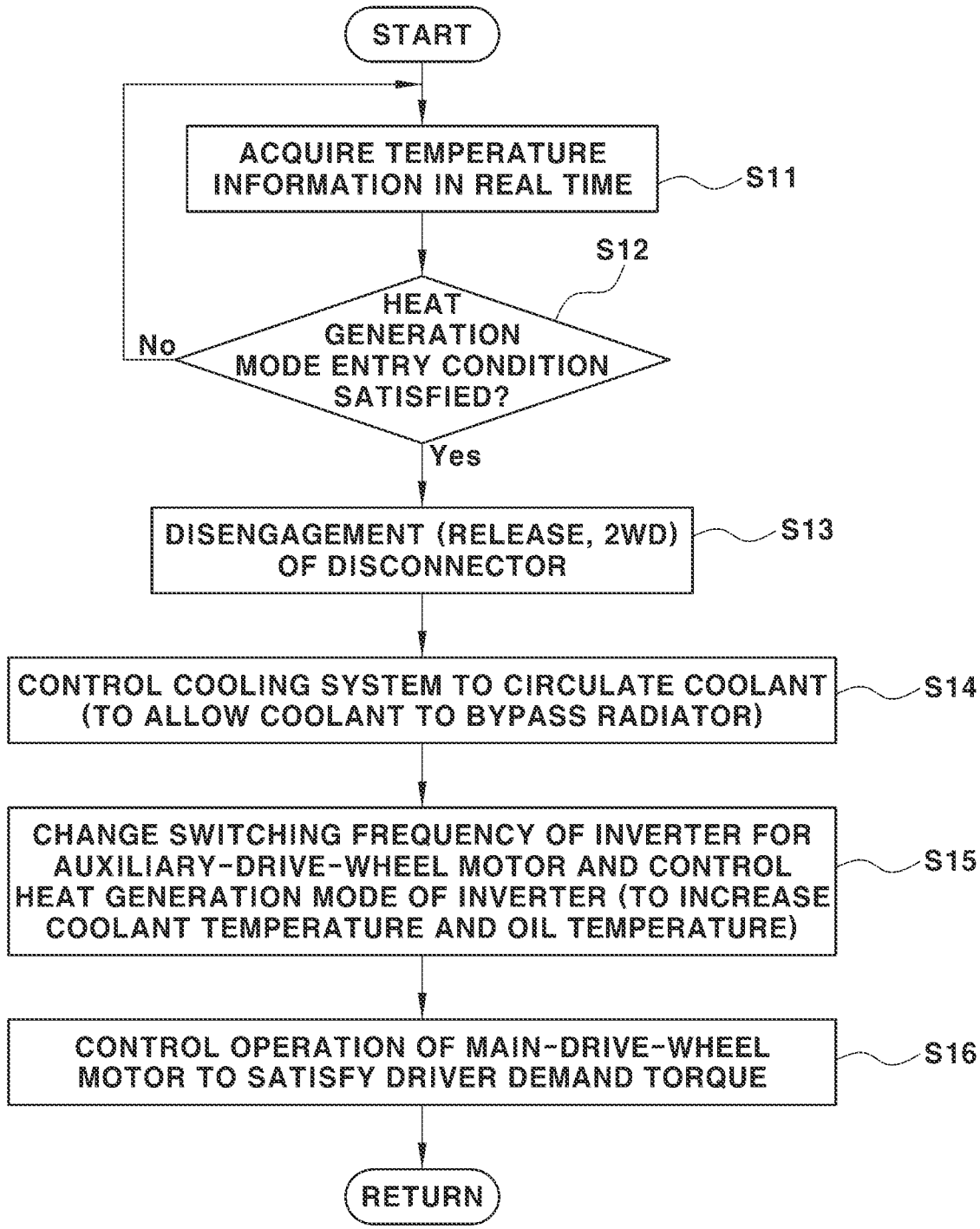
FIG. 7 is a flowchart showing an oil temperature control process according to an embodiment of the present invention.

FIG. 7 is a flowchart showing an oil temperature control process according to an embodiment of the present invention. An oil temperature control process according to an embodiment of the present invention will be described below with reference to FIG. 7.

First, the controller 21 acquires, from signals from the temperature sensors 17a, 17b, and 18, temperature information, i.e., the temperature of the oil in the motors, the temperature of the outside air, or both the temperature of the oil in the motors and the temperature of the outside air, in real time (step S11). Subsequently, the controller 21 determines, based on the acquired real-time temperature information, whether the heat generation mode entry condition is satisfied (step S12).

In the process of determining whether to enter the heat generation mode, when all of the current temperatures of the oil detected by the oil temperature sensors 17a and 17b are equal to or lower than the first set temperature, the controller 21 may determine that the heat generation mode entry condition is satisfied.

Alternatively, when the current temperature of the outside air detected by the outside air temperature sensor 18 is equal to or lower than the second set temperature, the controller 21 may determine that the heat generation mode entry condition is satisfied.

Alternatively, when all of the current temperatures of the oil detected by the oil temperature sensors 17a and 17b are equal to or lower than the first set temperature and the current temperature of the outside air detected by the outside air temperature sensor 18 is equal to or lower than the second set temperature, the controller 21 may determine that the heat generation mode entry condition is satisfied.

Upon determining that the heat generation mode entry condition is satisfied, the controller 21 performs control such that the disconnector 6 between the auxiliary-drive-wheel motor 2 and the auxiliary drive wheels 1 performs a disengagement operation (step S13).

Subsequently, the controller 21 controls the cooling system so that the coolant circulates along the coolant line 14 (step S14). While the coolant circulates in the cooling system, the oil used in the motors 2 and 8 circulates to the heat exchange unit 9 through the oil line 10.

As the cooling system is controlled, the coolant may sequentially pass through the front-wheel inverter 31 and the rear-wheel inverter 32, which are power electronic (PE) parts, and then may sequentially pass through the heat exchange unit 9 of the rear-wheel motor 8 and the heat exchange unit 9 of the front-wheel motor 2.

In the process of controlling the cooling system, the controller 21 controls operation of the flow control valve 16 so that the coolant bypasses the radiator 13. In this case, the flow control valve 16 may be controlled to close the passage of the outlet-side coolant line 14 from the radiator 13 and open the passage of the bypass line 15.

Subsequently, the inverter 31 of the auxiliary-drive-wheel motor 2 is controlled at a switching frequency set for the heat generation mode (step S15).

Subsequently, operation of the main-drive-wheel motor 8 is controlled so that the driver demand torque according to the driving state input by the driver is satisfied only by the main-drive-wheel motor 8 (step S16).

In embodiments of the present invention, the driver demand torque is determined based on a value according to driver driving input, such as operation of an accelerator pedal by the driver. Since a process and method for determining the driver demand toque based on a value according to driver driving input are well known techniques, a detailed description thereof will be omitted in this specification.

In the disengaged (released) state of the disconnector 6, when the heat generation mode is entered by controlling a switching operation of a power conversion switching element in the inverter 31 for the auxiliary-drive-wheel motor 2 in a manner of changing the switching frequency of the switching element to a switching frequency set for the heat generation mode, the inverter 31 for the auxiliary-drive-wheel motor 2, which is a power electronic (PE) part, generates heat.

Accordingly, the coolant circulating along the coolant line 14 passes through the coolant passage provided in the inverter 31 for the auxiliary-drive-wheel motor 2, which generates heat, and therefore the temperature of the coolant may be increased by the heat of the inverter 31.

As a result, the heated coolant exchanges heat with the oil that has passed through the motors in the heat exchange unit 9 of each of the motors 2 and 8, so that the temperature of the oil may be increased by the coolant.

As described above, according to embodiments of the present invention, it is possible to cause the inverter to generate heat at a high temperature (e.g., 140° C.) by deliberately increasing the switching frequency of the inverter and to supply the heat generated from the inverter to the oil of the motor through the coolant, thereby reducing the viscosity of the oil in the motor, thus reducing the running resistance of the vehicle and increasing the efficiency of use of electricity and the all-electric range (AER) of the vehicle.

In the embodiment shown in FIG. 7, the switching frequency set for the heat generation mode may be determined through experimentations in the vehicle development stage, and may then be stored in the controller 21 so as to be used to perform the heat generation mode.

Figure 8:
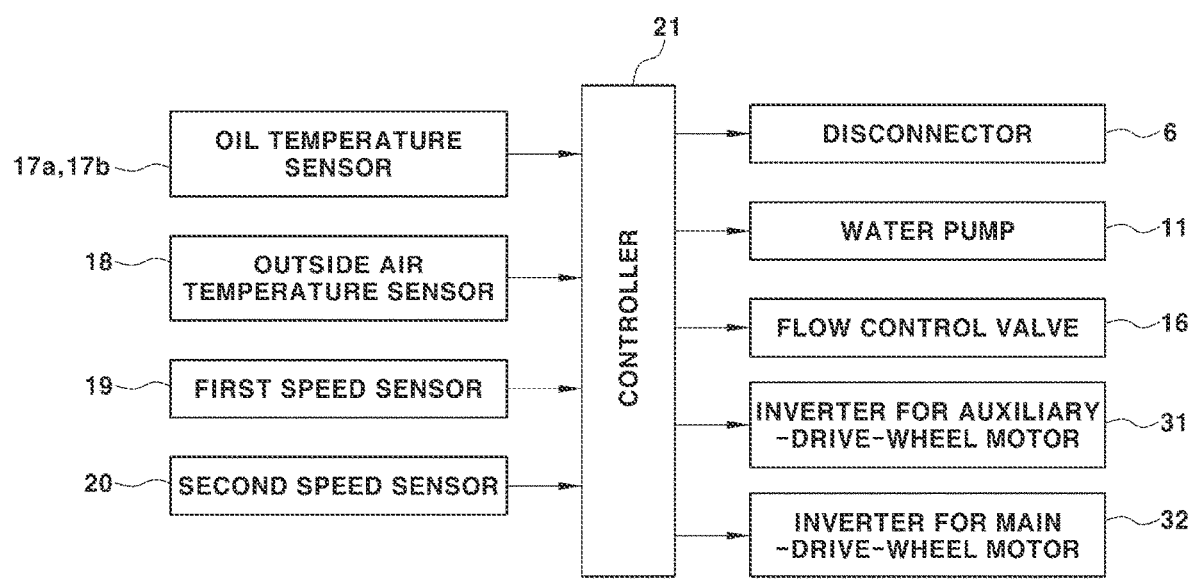
FIG. 8 is a block diagram showing main components of an oil temperature control system according to another embodiment of the present invention.
Figure 9:
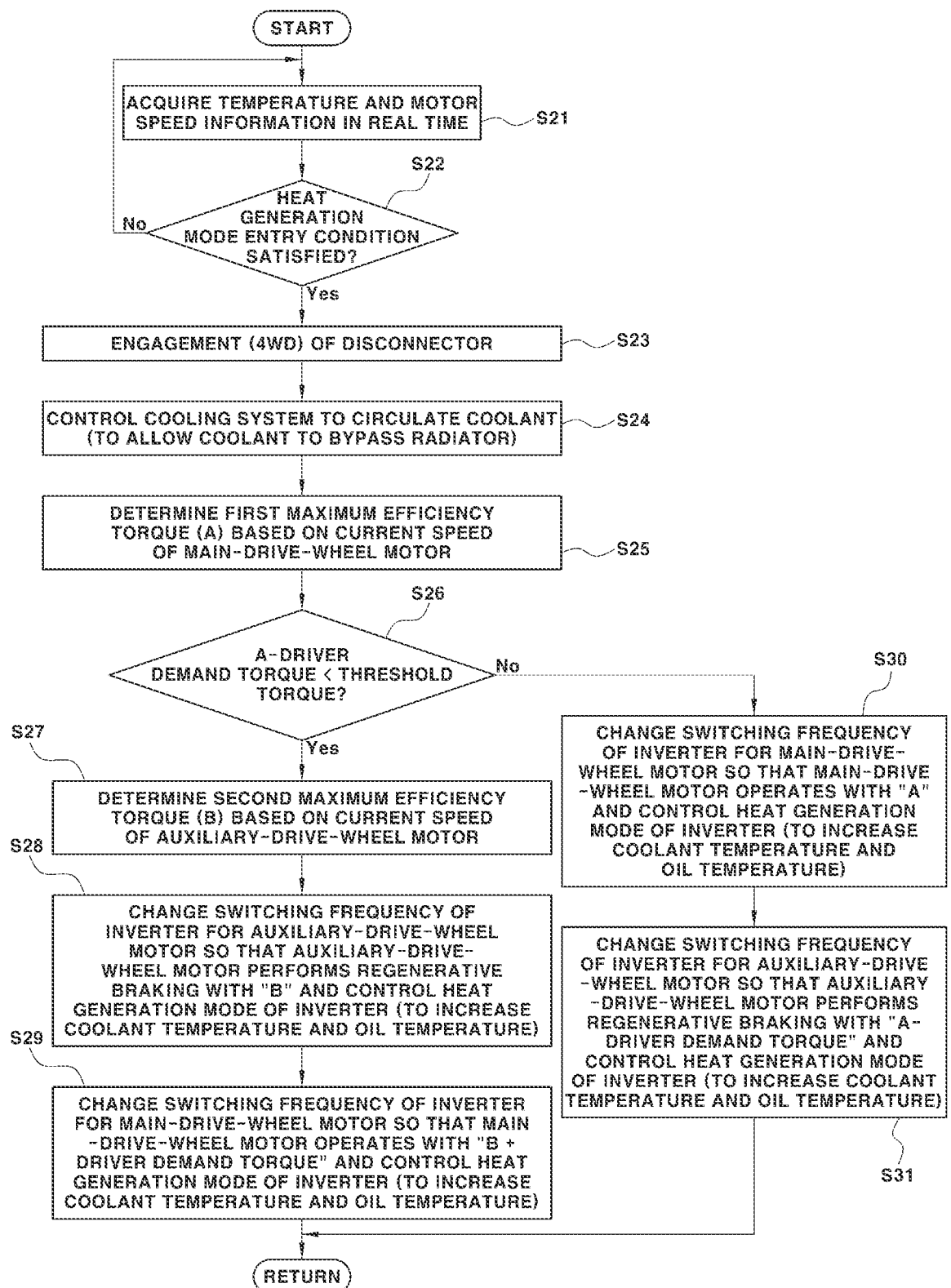
FIG. 9 is a flowchart showing an oil temperature control process according to another embodiment of the present invention.
Figure 10:
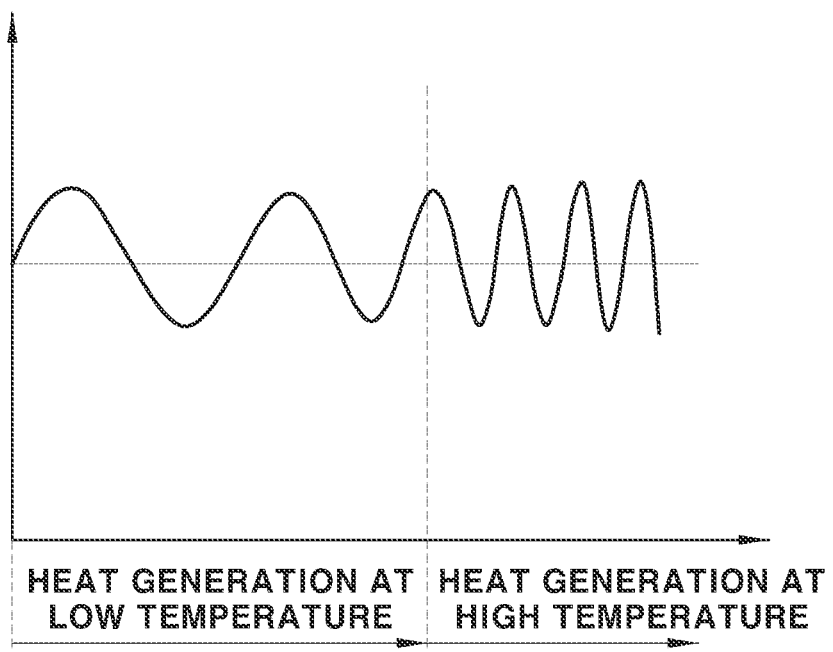
FIG. 10 is a diagram illustrating a state in which a switching frequency is changed when a heat generation mode is entered in another embodiment of the present invention.

FIG. 8 is a block diagram showing main components of an oil temperature control system according to another embodiment of the present invention, and FIG. 9 is a flowchart showing an oil temperature control process according to another embodiment of the present invention. FIG. 10 is a diagram illustrating a state in which a switching frequency is changed when a heat generation mode is entered in another embodiment of the present invention.

Hereinafter, an oil temperature control system for an electric vehicle according to another embodiment of the present invention will be described in detail.

As another embodiment of the present invention, the oil temperature control system for an electric vehicle may further include a speed sensor for detecting the speed of each motor. Here, the speed of each motor means the rotational speed of the main-drive-wheel motor (e.g., the rear-wheel motor) and the rotational speed of the auxiliary-drive-wheel motor (e.g., the front-wheel motor).

In embodiments of the present invention, the speed sensor includes a first speed sensor 19 for detecting the speed of the main-drive-wheel motor 8 and a second speed sensor 20 for detecting the speed of the auxiliary-drive-wheel motor 2.

The first speed sensor 19 and the second speed sensor 20 may be general resolvers mounted on the main-drive-wheel motor 8 and the auxiliary-drive-wheel motor 2, and a process of obtaining the speed (rotational speed) of a corresponding motor from a signal from a resolver is a well-known technique.

In the case of a vehicle equipped with the front-wheel disconnector 6, the main-drive-wheel motor 8 is a rear-wheel motor, and the auxiliary-drive-wheel motor 2 is a front-wheel motor. On the contrary, in the case of a vehicle equipped with the rear-wheel disconnector, the main-drive-wheel motor 8 is a front-wheel motor, and the auxiliary-drive-wheel motor 2 is a rear-wheel motor.

In addition, in the case of an electric vehicle in which a front-wheel motor and a rear-wheel motor are mounted and no disconnector is mounted, the main-drive-wheel motor is a predetermined one of the front-wheel motor and the rear-wheel motor, and the auxiliary-drive-wheel motor is the other of the front-wheel motor and the rear-wheel motor.

In another embodiment, upon determining, based on a value detected by the temperature sensor, that the heat generation mode entry condition is satisfied, the controller enters the heat generation mode, so that the operating point of the front-wheel motor or the rear-wheel motor is guided to the maximum efficiency torque area, and the switching frequency of the inverter is changed to a switching frequency set for the heat generation mode to cause the inverter to generate heat.

The oil temperature control process according to the other embodiment may be applied to an electric vehicle in which no disconnector is mounted. In the case of an electric vehicle equipped with a disconnector, the oil temperature control process according to the other embodiment may be performed in the engaged state of the disconnector.

The other embodiment will be described below in more detail with reference to FIGS. 8 to 10. First, the controller 21 acquires, from signals from the temperature sensors 17a, 17b, and 18, temperature information, i.e., the temperature of the oil in the motors, the temperature of the outside air, or both the temperature of the oil in the motors and the temperature of the outside air, in real time (step S21).

In addition, the controller 21 acquires, from signals from the speed sensors 19 and 20, information on the speeds (RPMs) of the motors, i.e., the speed of the main-drive-wheel motor 8 and the speed of the auxiliary-drive-wheel motor 2, in real time (step S21).

Subsequently, the controller 21 determines, based on the acquired real-time temperature information, whether the heat generation mode entry condition is satisfied (step S22). Here, the heat generation mode entry condition is the same as that of the embodiment shown in FIG. 7.

Subsequently, upon determining that the heat generation mode entry condition is satisfied, the controller 21 controls the cooling system in the engaged state of the disconnector 6 (step S23) so that the coolant circulates along the coolant line 14, similar to the embodiment shown in FIG. 7 (step S24).

While the coolant circulates in the cooling system, the oil used in the motors 2 and 8 circulates to the heat exchange units 9 through the oil line 10.

As the cooling system is controlled, the coolant may sequentially pass through the front-wheel inverter 31 and the rear-wheel inverter 32, which are power electronic (PE) parts, and then may sequentially pass through the heat exchange unit 9 of the rear-wheel motor 8 and the heat exchange unit 9 of the front-wheel motor 2.

In the process of controlling the cooling system, the controller 21 controls operation of the flow control valve 16 so that the coolant bypasses the radiator 13. In this case, the flow control valve 16 may be controlled to close the passage of the outlet-side coolant line 14 from the radiator 13 and open the passage of the bypass line 15.

Subsequently, the controller 21 determines a first maximum efficiency torque A based on the current speed of the main-drive-wheel motor 8 detected by the first speed sensor 19 (step S25).

In this process, the controller 21 may calculate the first maximum efficiency torque A, which is the maximum efficiency torque at the current speed (RPM), in a conventional manner using equations or may extract the first maximum efficiency torque A at the current speed (RPM) from operating point map data pre-stored therein.

Subsequently, a difference between the determined first maximum efficiency torque A and the driver demand torque according to the driving state input by the driver is compared with a predetermined threshold torque (step S26).

When the difference between the first maximum efficiency torque A and the driver demand torque according to the driving state input by the driver is equal to or greater than the predetermined threshold torque (when the driver demand torque is less than a predetermined level), the controller 21 controls the motors such that the main-drive-wheel motor 8 is driven with the first maximum efficiency torque A (step S30) and such that the auxiliary-drive-wheel motor 2 performs regenerative braking (step S31) in order to satisfy the driver demand torque and to cause power electronic (PE)

parts for increasing the temperature of the oil in the motors, i.e., the front-wheel inverter 31 and the rear-wheel inverter 32, to generate heat.

Preferably, in the state in which the difference between the first maximum efficiency torque A and the driver demand torque is equal to or greater than the predetermined threshold torque, the auxiliary-drive-wheel motor 2 is controlled to perform regenerative braking with minimum required torque, which corresponds to the difference between the first maximum efficiency torque A and the driver demand torque (step S31).

While the main-drive-wheel motor 8 is driven and the auxiliary-drive-wheel motor 2 performs regenerative braking, the switching frequencies of the front-wheel inverter 31 and the rear-wheel inverter 32, which are power electronic (PE) parts, are changed to the switching frequency set for the heat generation mode. The switching operation of the inverters 31 and 32 is controlled at the changed switching frequency, i.e., the switching frequency set for the heat generation mode, whereby heat is generated from the inverters.

In the process of controlling the heat generation mode, in the case of the inverter 32 for the main-drive-wheel motor 8, the switching frequency set for the heat generation mode is a switching frequency at which the main-drive-wheel motor 8 is driven with the first maximum efficiency torque A.

In addition, in the case of the inverter 31 for the auxiliary-drive-wheel motor 2, the switching frequency set for the heat generation mode is a switching frequency at which the auxiliary-drive-wheel motor 2 is controlled to perform regenerative braking with minimum required torque, which corresponds to the difference between the first maximum efficiency torque A and the driver demand torque.

As a result, while the inverters 31 and 32 generate heat, the coolant circulating along the coolant line 14 is heated while passing through the coolant passages of the inverters, and the heated coolant exchanges heat with the oil of the motors 2 and 8 in the heat exchange units 9 of the motors 2 and 8, thereby increasing the temperature of the oil.

Referring to FIG. 10, a switching frequency at which the inverter generates heat at a low temperature and a switching frequency at which the inverter generates heat at a high temperature are schematically illustrated. In the heat generation mode, if the switching frequency of the inverter is changed to a high switching frequency in order to generate heat at a high temperature, the amount of heat generated may be increased. Because the inverter has a small heat capacity, the inverter may rapidly generate and dissipate heat. Therefore, transfer of heat from the inverter to the coolant may be rapidly achieved.

As described above, according to embodiments of the present invention, it is possible to cause the inverter to generate heat at a high temperature (e.g., 140° C.) by deliberately increasing the switching frequency of the inverter and to supply the heat generated from the inverter to the oil of the motor through the coolant, thereby reducing the viscosity of the oil in the motor, thus reducing the running resistance of the vehicle and increasing the efficiency of use of electricity and the all-electric range (AER) of the vehicle.

In step S26 in FIG. 9, when the difference between the first maximum efficiency torque A and the driver demand torque is less than the threshold torque (when the driver demand torque is equal to or greater than a predetermined level), the controller 21 determines a second maximum efficiency torque B corresponding to the current speed of the auxiliary-drive-wheel motor 2 (step S27).

In this case, the controller 21 may calculate the second maximum efficiency torque B, which is the maximum efficiency torque at the current speed (RPM) of the auxiliary-drive-wheel motor 2, in a conventional manner using equations or may extract the second maximum efficiency torque B at the current speed (RPM) from operating point map data pre-stored therein.

Subsequently, the controller 21 controls the auxiliary-drive-wheel motor 2 to perform regenerative braking with the second maximum efficiency torque B at the current speed (step S28), and controls the main-drive-wheel motor 8 to operate with torque corresponding to a sum of the driver demand torque and the second maximum efficiency torque B (step S29).

As a result, even when the difference between the first maximum efficiency torque A and the driver demand torque is less than the threshold torque (when the driver demand torque is equal to or greater than a predetermined level), while the main-drive-wheel motor 8 is driven and the auxiliary-drive-wheel motor 2 performs regenerative braking, the switching frequencies of the front-wheel inverter 31 and the rear-wheel inverter 32, which are power electronic (PE) parts, are changed to the switching frequency set for the heat generation mode. The switching operation of the inverters 31 and 32 is controlled at the changed switching frequency, i.e., the switching frequency set for the heat generation mode, whereby heat is generated from the inverters.

Here, in the case of the inverter 32 for the main-drive-wheel motor 8, the switching frequency set for the heat generation mode is a switching frequency at which the main-drive-wheel motor 8 is driven with torque corresponding to a sum of the driver demand torque and the second maximum efficiency torque B.

In addition, in the case of the inverter 31 for the auxiliary-drive-wheel motor 2, the switching frequency set for the heat generation mode is a switching frequency at which the auxiliary-drive-wheel motor 2 is controlled to perform regenerative braking with the second maximum efficiency torque B.

As a result, while the inverters 31 and 32 generate heat, the coolant circulating along the coolant line 14 is heated while passing through the coolant passages of the inverters 31 and 32, and the heated coolant exchanges heat with the oil of the motors 2 and 8 in the heat exchange units 9 of the motors 2 and 8, thereby increasing the temperature of the oil.

As is apparent from the above description, according to the oil temperature control system for an electric vehicle according to embodiments of the present invention, it is possible to control the temperature of oil cooling and lubricating a driving motor to an appropriate temperature during travel of the electric vehicle.

In particular, it is possible to prevent the temperature of oil from being lowered below a predetermined level using waste heat generated from an inverter when the vehicle travels in a low-temperature environment, thereby preventing the viscosity of the oil from greatly increasing.

As a result, it is possible to solve not only a problem of an increase in the running resistance of the vehicle due to an increase in the viscosity of the oil, but also a problem of a reduction in the efficiency of use of electricity and the all-electric range (AER) of the vehicle.

Embodiments of the present invention have been described above with reference to exemplary embodiments. The embodiments described in the specification and shown in the accompanying drawings are illustrative only and are not intended to represent all aspects of embodiments of the invention. Therefore, embodiments of the present invention are not limited to the embodiments presented herein, and it is to be understood by those skilled in the art that various modifications or changes can be made without departing from the technical spirit or scope of the invention as disclosed in the appended claims.

What is claimed is:

1. An oil temperature control system for an electric vehicle, the system comprising:
a heat exchange unit configured to perform heat exchange between an oil used to cool a driving motor and a coolant in the electric vehicle;
a temperature sensor comprising an oil temperature sensor configured to detect a temperature of the oil in the driving motor or an outside air temperature sensor configured to detect a temperature of outside air;
a controller configured to:
receive a signal from the temperature sensor to determine, based on the temperature detected by the temperature sensor, whether a heat generation mode entry condition to cause a power electronic part to generate heat is satisfied; and
operate the power electronic part in a heat generation mode in response to a determination that the heat generation mode entry condition is satisfied; and
a cooling system configured to allow the coolant used to cool the power electronic part operating in the heat generation mode to circulate through a passage penetrating the heat exchange unit so that the coolant exchanges heat with the oil in the heat exchange unit,
wherein:
the power electronic part comprises an inverter connected to the driving motor to apply three-phase alternating current to the driving motor, and
the controller is further configured to change a switching frequency of the inverter for the driving motor to a switching frequency set for the heat generation mode.

2. The system of claim 1, wherein the heat generation mode entry condition comprises a condition in which the temperature detected by the temperature sensor is equal to or lower than a predetermined set temperature.

3. The system of claim 1, wherein:
the driving motor comprises a front-wheel motor configured to drive front wheels and a rear-wheel motor configured to drive rear wheels; and
the inverter comprises a front-wheel inverter connected to the front-wheel motor to apply the three-phase alternating current to the front-wheel motor or a rear-wheel inverter connected to the rear-wheel motor to apply the three-phase alternating current to the rear-wheel motor.

4. The system of claim 3, wherein the temperature sensor further comprises:
a front-wheel-motor oil temperature sensor configured to detect the temperature of the oil in the front-wheel motor; and
a rear-wheel-motor oil temperature sensor configured to detect the temperature of the oil in the rear-wheel motor.

5. The system of claim 3, further comprising:
a disconnector mounted between an auxiliary-drive-wheel motor and auxiliary drive wheels connected to the auxiliary-drive-wheel motor so that power can be transmitted between the auxiliary-drive-wheel motor and the auxiliary drive wheels, the disconnector being configured to allow or interrupt a transmission of the power between the auxiliary-drive-wheel motor and the auxiliary drive wheels,
wherein the auxiliary-drive-wheel motor is one of the front-wheel motor or the rear-wheel motor.

6. The system of claim 5, wherein, upon entering the heat generation mode, the controller is further configured to control the disconnector to perform a disengagement operation to interrupt the transmission of the power between the auxiliary-drive-wheel motor and the auxiliary drive wheels.

7. The system of claim 6, wherein, upon entering the heat generation mode, the controller is further configured to control an operation of a main-drive-wheel motor, which is the other of the front-wheel motor and the rear-wheel motor, such that a driver demand torque is satisfied only by torque of the main-drive-wheel motor.

8. The system of claim 6, wherein, upon entering the heat generation mode, in order to cause the inverter for the auxiliary-drive-wheel motor to generate heat, the controller is configured to change a switching frequency of the inverter for the auxiliary-drive-wheel motor to the switching frequency set for the heat generation mode.

9. The system of claim 3, wherein:
upon entering the heat generation mode, the controller is further configured to determine a first maximum efficiency torque based on a current speed of a main-drive-wheel motor, which is the front-wheel motor or the rear-wheel motor;
in response to a difference between the first maximum efficiency torque and a driver demand torque being equal to or greater than a predetermined threshold torque, the controller is further configured to change a switching frequency of the inverter for the main-drive-wheel motor to the switching frequency set for the heat generation mode; and
the switching frequency set for the heat generation mode is a switching frequency set to allow the main-drive-wheel motor to operate with the first maximum efficiency torque.

10. The system of claim 9, wherein:
in a state in which the heat generation mode is entered, the controller is further configured to change a switching frequency of the inverter for an auxiliary-drive-wheel motor, which is the other of the front-wheel inverter and the rear-wheel inverter, to a second switching frequency set for the heat generation mode; and
the second switching frequency set for the heat generation mode is a switching frequency set to allow the auxiliary-drive-wheel motor to perform regenerative braking with a torque corresponding to a difference between the first maximum efficiency torque and the driver demand torque.

11. The system of claim 10, further comprising a disconnector mounted between the auxiliary-drive-wheel motor and auxiliary drive wheels connected to the auxiliary-drive-wheel motor so that power can be transmitted between the auxiliary-drive-wheel motor and the auxiliary drive wheels to allow or interrupt a transmission of the power between the auxiliary-drive-wheel motor and the auxiliary drive wheels.

12. The system of claim 11, wherein, upon entering the heat generation mode, the controller is further configured to control the disconnector to perform an engagement operation to allow the transmission of the power between the auxiliary-drive-wheel motor and the auxiliary drive wheels.

13. The system of claim 3, wherein:
upon entering the heat generation mode, the controller is configured to determine a first maximum efficiency torque based on a current speed of a main-drive-wheel motor which is the front-wheel motor or the rear-wheel motor;

in response to a difference between the first maximum efficiency torque and a driver demand torque being less than a predetermined threshold torque, the controller is further configured to determine a second maximum efficiency torque based on a current speed of an auxiliary-drive-wheel motor, which is the other of the front-wheel motor and the rear-wheel motor;

the controller is configured to change a switching frequency of the inverter for the auxiliary-drive-wheel motor to a first switching frequency set for the heat generation mode; and the first switching frequency set for the heat generation mode is a switching frequency set to allow the auxiliary-drive-wheel motor to perform regenerative braking with the second maximum efficiency torque.

14. The system of claim 13, wherein:
in a state in which the heat generation mode is entered, the controller is further configured to change a switching frequency of the inverter for the main-drive-wheel motor to a second switching frequency set for the heat generation mode; and the second switching frequency set for the heat generation mode is a switching frequency set to allow the main-drive-wheel motor to operate with a torque corresponding to a sum of the second maximum efficiency torque and the driver demand torque.

15. The system of claim 13, further comprising a disconnector mounted between the auxiliary-drive-wheel motor and auxiliary drive wheels connected to the auxiliary-drive-wheel motor so that power can be transmitted between the auxiliary-drive-wheel motor and the auxiliary drive wheels to allow or interrupt a transmission of the power between the auxiliary-drive-wheel motor and the auxiliary drive wheels.

16. The system of claim 15, wherein, upon entering the heat generation mode, the controller is further configured to control the disconnector to perform an engagement operation to allow the transmission of the power between the auxiliary-drive-wheel motor and the auxiliary drive wheels.

17. An oil temperature control system for an electric vehicle, the system comprising:
a heat exchange unit configured to perform heat exchange between an oil used to cool a driving motor and a coolant in the electric vehicle;
a temperature sensor comprising an oil temperature sensor configured to detect a temperature of the oil in the driving motor or an outside air temperature sensor configured to detect a temperature of outside air;
a controller configured to receive a signal from the temperature sensor to determine, based on the temperature detected by the temperature sensor, whether a heat generation mode entry condition to cause a power electronic part to generate heat is satisfied and to operate the power electronic part in a heat generation mode in response to a determination that the heat generation mode entry condition is satisfied; and
a cooling system configured to allow the coolant used to cool the power electronic part operating in the heat generation mode to circulate through a passage penetrating the heat exchange unit so that the coolant exchanges heat with the oil in the heat exchange unit, wherein the cooling system comprises:
a radiator configured to dissipate heat from the coolant;
a water pump configured to circulate the coolant along a coolant line;
a bypass line branching from the coolant line to allow the coolant bypassing the radiator to flow therethrough; and
a flow control valve configured to control a flow of the coolant such that the coolant circulates along the bypass line without passing through the radiator, wherein, upon entering the heat generation mode, the controller is configured to control the flow control valve such that the coolant flows along the bypass line without passing through the radiator.

18. The system of claim 17, wherein:
the driving motor comprises a front-wheel motor configured to drive front wheels and a rear-wheel motor configured to drive rear wheels; and
the power electronic part comprises an inverter comprising a front-wheel inverter connected to the front-wheel motor to apply three-phase alternating current to the front-wheel motor or a rear-wheel inverter connected to the rear-wheel motor to apply the three-phase alternating current to the rear-wheel motor.

19. The system of claim 18, further comprising a disconnector mounted between an auxiliary-drive-wheel motor, which is the front-wheel motor or the rear-wheel motor, and auxiliary drive wheels connected to the auxiliary-drive-wheel motor so that power can be transmitted between the auxiliary-drive-wheel motor and the auxiliary drive wheels, the disconnector being configured to allow or interrupt a transmission of the power between the auxiliary-drive-wheel motor and the auxiliary drive wheels; and
wherein, upon entering the heat generation mode, the controller is configured to:
control the disconnector to perform a disengagement operation to interrupt the transmission of the power between the auxiliary-drive-wheel motor and the auxiliary drive wheels;
control an operation of a main-drive-wheel motor, which is the other of the front-wheel motor and the rear-wheel motor, such that a driver demand torque is satisfied only by a torque of the main-drive-wheel motor; and
change a switching frequency of the inverter for the auxiliary-drive-wheel motor to a switching frequency set for the heat generation mode in order to cause the inverter for the auxiliary-drive-wheel motor to generate heat.

20. The system of claim 18, wherein, upon entering the heat generation mode, the controller is configured to:
determine a first maximum efficiency torque based on a current speed of a main-drive-wheel motor, which is the front-wheel motor or the rear-wheel motor;
change a switching frequency of the inverter for the main-drive-wheel motor to a first switching frequency set for the heat generation mode in response to a difference between the first maximum efficiency torque and a driver demand torque being equal to or greater than a predetermined threshold torque, wherein the first switching frequency set for the heat generation mode is a switching frequency set to allow the main-drive-wheel motor to operate with the first maximum efficiency torque; and
change a switching frequency of the inverter for an auxiliary-drive-wheel motor, which is the other of the front-wheel motor and the rear-wheel motor, to a second switching frequency set for the heat generation mode, wherein the second switching frequency set for the heat generation mode is a switching frequency set to allow the auxiliary-drive-wheel motor to perform regenerative braking with a torque corresponding to a difference between the first maximum efficiency torque and the driver demand torque.

* * * * *